Jan. 22, 1924.
S. K. PAIGE ET AL
1,481,732
TROLLEY WHEEL AND SUPPORT
Filed March 14, 1923
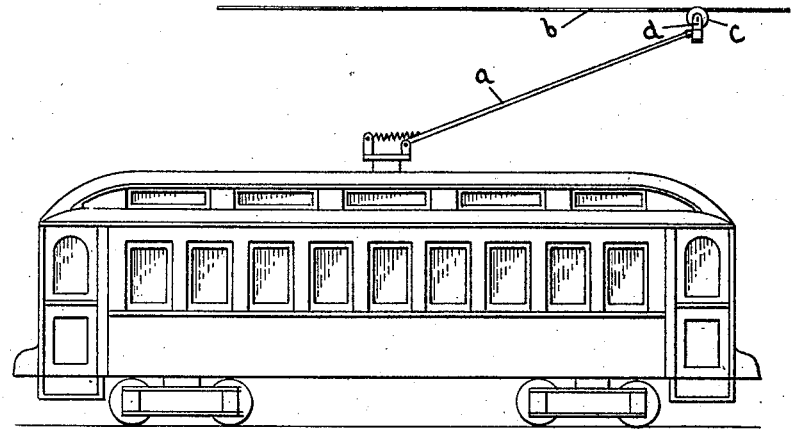
Fig.1
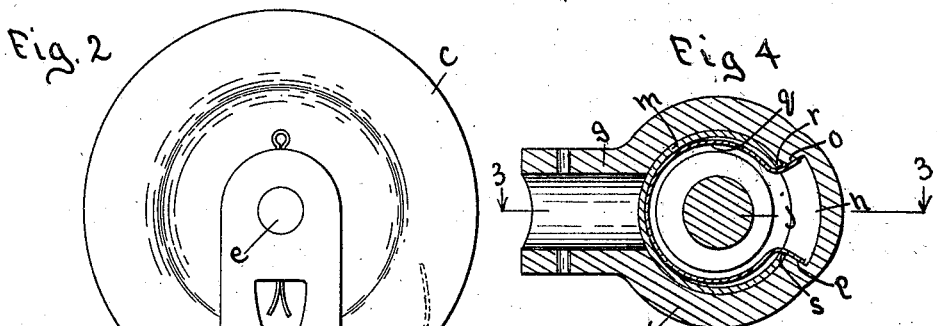
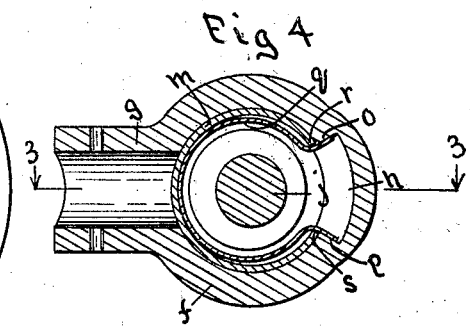
Fig. 4
Fig. 2
Fig. 3
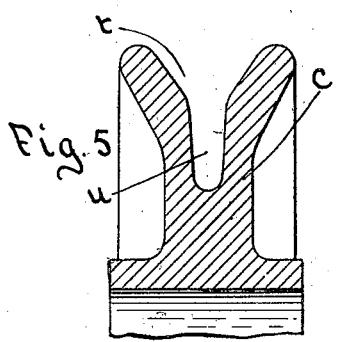
Fig. 5
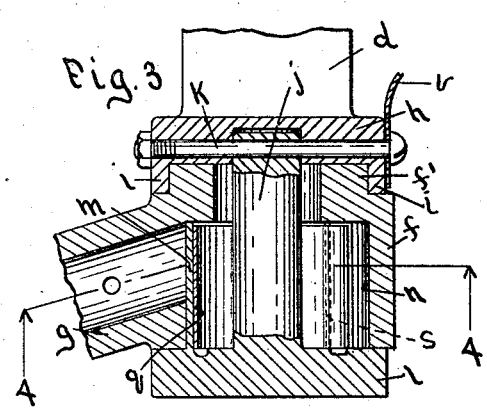
INVENTORS
Sam K. Paige
Sam K. Paige, Jr.
by Wright, Brown, Quinby & May
att'ys Patented Jan. 22, 1924.

1,481,732

UNITED STATES PATENT OFFICE.

SAM K. PAIGE, OF BOSTON, AND SAM K. PAIGE, JR., OF WINCHESTER, MASSACHUSETTS.

TROLLEY WHEEL AND SUPPORT.

Application filed March 14, 1923. Serial No. 624,899.

*To all whom it may concern:*

Be it known that we, SAM K. PAIGE and SAM K. PAIGE, Jr., citizens of the United States, residing, respectively, at Boston, in the county of Suffolk, and Winchester, in the county of Middlesex, both in the State of Massachusetts, have invented new and useful Improvements in Trolley Wheels and Supports, of which the following is a specification.

The present invention relates to trolley wheels for use with electrically driven vehicles receiving power from an overhead conductor.

The primary object is to prevent the wheel, which is adapted to roll along such overhead conductor and to receive the current therefrom, from "jumping" or slipping from the wire, which is an accident of frequent occurrence with the trolley wheels now used, particularly when the car passes over a crossover from one track to another or traverses a section of curved track. In these situations the overhead wire diverges more or less from the direction of the pole which supports the trolley wheel on its end. This object of the invention is accomplished by mounting the wheel in a support which, in its turn, is mounted on the supporting pole, so that it may turn freely about a vertical axis, whereby the wheel is able to follow the line of the overhead wire and maintain itself in the same plane with the wire, however much the pole may diverge from the vertical plane through the wire.

The foregoing object is not new in itself and attempts have heretofore been made to accomplish it by mounting the trolley wheel in the relation and with the capacity for movement like that above defined; but such attempts and suggestions for the solving of the problem as have heretofore been made have failed to serve the intended purpose, and have not come into practical use, so far as we are aware.

Our more particular object has been to provide a trolley wheel support which not only serves the purpose in the manner above described, but does so in an improved way, with simplicity of mechanical construction, low cost of manufacture, convenience of assembling and disassembling for the purpose of giving whatever attention may be necessary to interior parts, and protection from the weather of interior parts.

The exact principles and characteristics in which the invention consists can best be explained with reference to a detailed disclosure of the preferred form of the invention which is given in the following specification in connection with the annexed drawings.

In the drawings,—

Figure 1 is a general view showing an electric car having a trolley wheel and supporting means for the same embodying this invention.

Figure 2 is a side elevation on a larger scale of the trolley wheel mount in which particularly the invention is embodied.

Figure 3 is a section on a still larger scale of the trolley wheel mount, the plane of section including the axis of the mount.

Figure 4 is a cross section on line 4—4 of Figure 3.

Figure 5 is a sectional detail view of the trolley wheel.

Like reference characters designate the same parts wherever they occur in all the figures.

The car itself, the trolley pole $a$ and the overhead conductor or wire $b$ may have the same characteristics as the common equipment now used for electric car traffic when an overhead conductor is used. The novel features of the invention reside in the mounting for the trolley wheel $c$. This wheel is provided with a groove in its rim, as usual, to receive the wire and prevent its slipping sidewise therefrom. The direct support for the wheel is a fork or harp having arms $d$ which embrace the wheel and in which the pivot or axle $e$ of the wheel is mounted. This harp or support, in turn, is mounted to rotate on an upright axis in a socket or holder $f$ which is connected, preferably integrally, with an arm $g$ adapted to be mounted on the pole $a$. As indicated in the drawing, this arm is hollow so as to receive the end of the pole, but it may be mounted in any other desired way. When combined with a pole, said arm and socket become, in effect, a part of the pole, and the wheel supporting harp or member $d$ is then, in effect, swiveled in an upright position to the pole.

Referring to Figures 3 and 4 to show the details of the swivel mounting of the support $d$, the arms which compose this support are connected to and spring upward from a plate $h$ having a flange $i$ which overlaps and surrounds an upstanding central part or boss $f'$ of the holder $f$. A post $j$ projects into a recess in the under side of the plate $h$ and is secured therein by a locking pin $k$ or equivalent key device which passes through alined holes in the plate $h$ and in the post. The post is connected with an under plate $l$, either integrally or otherwise, and there rises from this plate $l$ a cylindrical rib or flange $m$ which is coaxial with the post $j$, and also with the mating surface of the flange $i$ and boss $f'$.

The interior of the holder $f$ is hollow, with a cylindrical opening from its under side of a diameter complemental to that of the rib $m$, whereby it is adapted to fit around and provide a bearing for said rib. In its upper side there is a hole of smaller diameter through which the post $j$ projects.

As the rib $m$ is connected with the trolley wheel support $d$, in a rigid manner when the parts are assembled, it forms the pivot or trunnion of such support, whereby the latter is swiveled in the socket $f$ so as to rotate about an upright or substantially vertical axis.

One side of the socket member or holder $f$ is widened to provide an eccentric chamber $n$ bounded by walls or shoulders $o$ and $p$, and in the adjacent side of the cylindrical flange $m$ there is cut an opening of substantially the same angular width as this chamber. A spring $q$ is placed inside the cylindrical rib and its ends are extended through the opening in said rib and into the chamber $n$, being bent outward to bear against the shoulders $o$ and $p$. The edges of the slot or openings in the side of the cylindrical rib furnish other shoulders or abutments $r$ and $s$ which also are adapted to bear against the spring.

This spring is preferably made from a strip of spring steel of such thickness and stiffness as to oppose the desired resistance to swiveling movement of the trolley wheel holder and to return the wheel to the normal central position after having been displaced. The width of the spring may be any width up to the depth of the open interior of the socket $f$; and the latter may be as great as the full height or thickness of the socket if desired. Thus there is ample room to accommodate a spring of whatever strength and stiffness may be required for the purpose, and thus enables the spring to be made long and thin enough to flex throughout the entire range of lateral oscillation of the wheel support without sensibly varying its resistance.

The trolley wheel is preferably made with a deep groove so as to minimize danger of the wheel jumping from the wire. The outer part of the groove designated $t$ in Figure 5, has a wide angle flare, but the sides of the bottom part are more nearly parallel, thus making it easy to place the wheel upon the wire and difficult for it to jump off.

Whenever, in the course of travel of the car, the trolley pole is caused to diverge in a horizontal plane from the overhead wire, the wheel is turned about its upright swivel axis. Then one or the other of the shoulders $r$ and $s$ of the cylindrical rib $m$ is moved toward the opposite shoulder or abutment $p$ or $o$, respectively, carrying the adjacent hooked-over end of the spring with it, and thereby flexing the spring, which resists such movement of the wheel and tends to restore it to the normal neutral position. In the neutral position, of course, both ends of the spring press equally against the abutments $o$ and $p$ and the shoulders $r$ and $s$.

It will be apparent that the trolley wheel holder is of the utmost simplicity. It is made of practically the irreducible minimum of parts, and these parts are of such a character that they can be assembled and disassembled easily, but yet afford great efficiency in operation and protection of the rubbing parts from harm by rain and other effects of the weather.

The spring $q$ is securely and adequately held by its confinement within the rib $m$ alone, wherefore it need not be pierced to receive a fastening of any sort, nor is it at any time under abnormal stress. If the spring be broken or used up, it may be repaired, or a new one substituted for it, with the utmost ease and readiness. Then it is protected from the effects of rain and exterior moisture by the formation of the socket $f$ and by the manner in which the plate $h$ and the plate $l$ are engaged with opposite ends of this socket. The overlapping flange $i$ of the plate $h$ at the top of the socket excludes even driving rain from penetrating the upper joint between the socket and fork, while the underlying plate $l$ prevents upward splashing of water into the interior. Then, also the rib $m$ provides a seal against entrance of water as to all parts except the cut away side opposite to the chamber $n$, and there the eccentric bulging of the socket causes its outer surface to project beyond the adjacent edge of the plate $l$ and afford such protection against entrance of water as is given by an overhanging ledge. The interior of the socket may be packed with grease, if desired, which preserves the spring and provides lubrication for the swivel bearing.

The part $v$ is an ice scraper formed as a tongue of sufficiently rigid material, held by the pin $k$ and projecting into the groove of the trolley wheel to cut away ice which may form during sleet storms.

Various modifications in detail may be made in the structure of this device, such, for instance, as making the post $j$ in one piece with the fork or harp, and connecting it detachably with the plate $l$, or by making the parts $j$, $l$ and $m$ out of any such number of separate parts fastened together as may best serve the purpose of economical manufacture, instead of being made in a single piece as shown. Therefore, the protection which we seek for our invention is not limited to the details of the specific embodiment of the invention illustrated in these drawings, or in any other way than is required by the intent of the claims when construed with reference to the prior art.

What we claim and desire to secure by Letters Patent is:

1. A trolley wheel support comprising a fork in which the wheel is mounted, a socket in which said fork has a swivel bearing, the swivel bearing being constituted by a cylindrical rib connected with the fork and fitting a complemental bearing in the socket, combined with a spring confined in the interior of said rib and having ends bearing upon complemental and opposed shoulders of the rib and socket.

2. A trolley wheel support comprising a fork adapted to carry the trolley wheel, a socket in which said fork has a swivel bearing to turn about an axis approximately perpendicular to the axis of the wheel, and a spring for normally holding the fork in a neutral position, said swivel bearing being provided by a hollow cylindrical rib secured to one of the parts constituted by said fork and socket, and fitting a complemental recess in the other of said parts, but said rib being open at one side with shoulders flanking this opening, and the other part having an eccentric recess with end abutments spaced approximately to register with the shoulders of said rib, and the spring being a curved strip of spring metal confined within the interior of said rib and having its ends bent outward through the opening in the rib and into engagement with the said abutments.

3. A trolley wheel support comprising a socket member adapted to be secured to the trolley-holding pole of an electric car, said socket member having an opening from its under side which is substantially cylindrical but formed with an eccentric recess or chamber at one side, a trolley fork or harp having a bottom plate provided with a downwardly extending flange adapted to seat upon and surround the upper side of the socket, a plate underlying the socket member, a post passing between said two plates and detachably connected to one of them, a cylindrical rib rising from the said underlying plate and fitting the interior of the socket and having an opening in said side adjacent to said eccentric chamber, and a spring occupying the interior of the rib with its ends projecting into said eccentric chamber and adapted to react against the ends thereof for opposing swiveling movement of the harp.

4. A trolley wheel support comprising a socket member adapted to be secured to the trolley-holding pole of an electric car, said socket member having an opening from its under side which is substantially cylindrical, a trolley fork or harp having a bottom plate provided with a downwardly extending flange adapted to seat upon and surround the upper side of the socket, a plate underlying the socket member, a post passing between said two plates and detachably connected to one of them, and a cylindrical rib rising from the said underlying plate and fitting the interior of the socket.

5. A trolley wheel support comprising a socket member adapted to be secured to the trolley-holding pole of an electric car, said socket member having an opening from its under side which is substantially cylindrical but formed with an eccentric recess or chamber at one side, a trolley fork or harp having a bottom plate provided with a downwardly extending flange adapted to seat upon and surround the upper side of the socket, a plate underlying the socket member, a post passing between said two plates and detachably connected to one of them, a cylindrical rib projecting from one of said plates and fitting the interior of the socket and having an opening in its side adjacent to said eccentric chamber, and a spring occupying the interior of the rib with its ends projecting into said eccentric chamber and adapted to react against the ends thereof for opposing swiveling movement of the harp.

6. A trolley wheel support comprising a socket member having a cylindrical internal bearing surface and shoulders or abutments outside of said surface, a holder on which the trolley wheel is mounted, a hollow rib secured to said holder and fitting said bearing surface, said rib being formed with a lateral opening and shoulders bounding said opening spaced approximately equally to the aforesaid abutments, and a spring of flat metal occupying the interior of said rib and extending at its ends through the opening of the latter, such ends being arranged to engage each with one of the shoulders of the rib and one of the abutments of the socket, whereby to oppose yielding resistance to swiveling movement of the wheel holder.

7. A trolley wheel support comprising a holder in which the wheel is mounted, a supporting member for said holder, and a spring, the parts constituted by said holder and supporting member having complemental bearing members, which bearing members are formed with approximately registering shoulders, and the spring being a curved strip approximately coaxial with said cylindrical members and with its ends bent to cross and engage the shoulders of both said bearing members.

8. A trolley wheel support comprising a holder in which the wheel is mounted, a supporting member for said holder, and a spring, one of the parts constituted by said holder and support being formed with an interior bearing surface and an opening from one side of said bearing surface having flanking shoulders or abutments, and the other of said parts having a hollow cylindrical rib fitting said bearing surface and having a lateral opening, the boundaries of which are adapted to register approximately with said shoulders, the spring being formed to occupy the interior of said hollow rib and its ends being bent outward to engage said abutments.

9. A trolley wheel support comprising a fork in which the wheel is mounted, a socket in which said fork has a swivel bearing, the swivel bearing being provided by a cylindrical rib connected with the fork and fitting a complemental bearing in the socket, combined with a spring confined in the interior of said rib and having ends bearing upon complemental and opposed shoulders of the rib and socket, and an ice cutter mounted on the base part of said fork at the rear side of the wheel and extending into the groove thereof.

In testimony whereof we have affixed our signatures.

SAM K. PAIGE.
SAM K. PAIGE, Jr.